(No Model.)
G. F. NEWELL.
PIPE WRENCH.
No. 328,601. Patented Oct. 20, 1885.
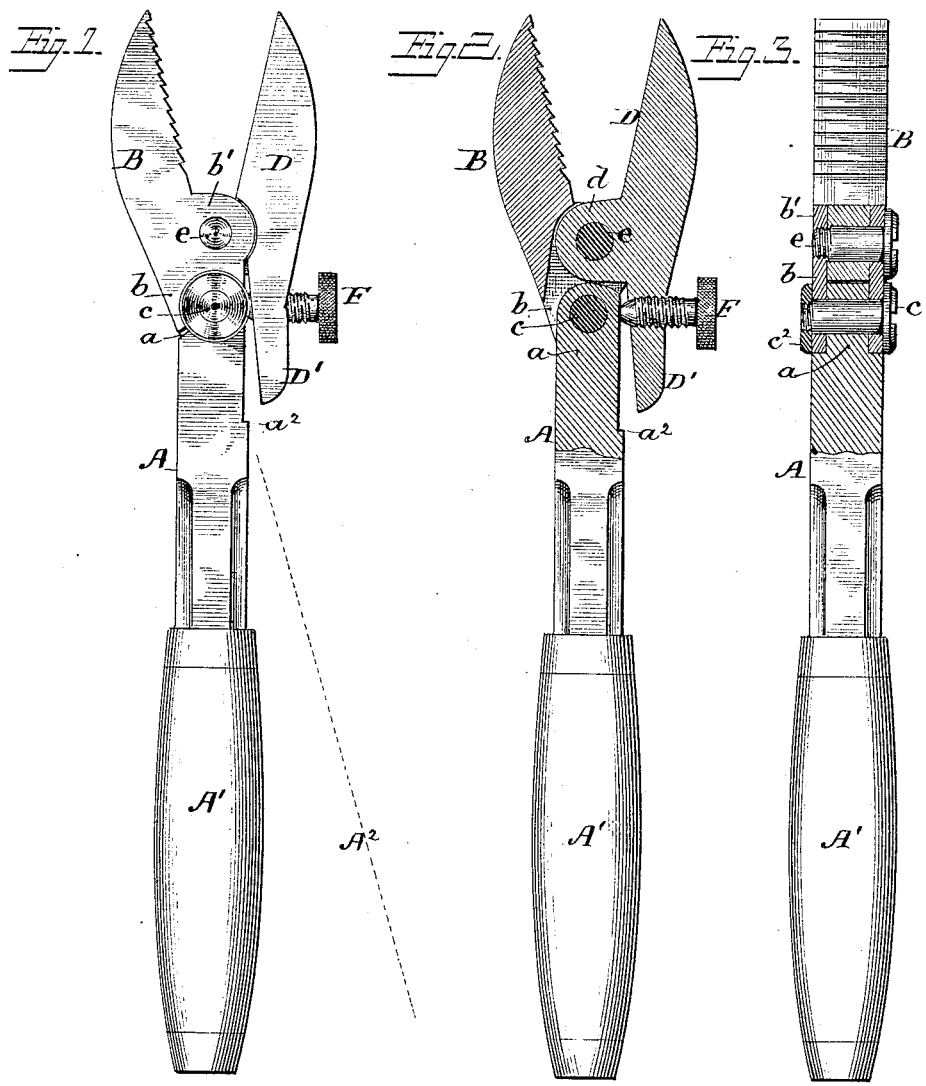
Witnesses:
L. C. Hills
W. B. Masson
Inventor:
George F. Newell,
by E. E. Masson
atty.

UNITED STATES PATENT OFFICE.

GEORGE F. NEWELL, OF BOSTON, ASSIGNOR OF ONE-HALF TO STILES FROST, OF NEWTON, MASSACHUSETTS.

PIPE-WRENCH.

SPECIFICATION forming part of Letters Patent No. 328,601, dated October 20, 1885.

Application filed September 13, 1884. Serial No. 142,974. (No model.)

*To all whom it may concern:*

Be it known that I, GEORGE F. NEWELL, a citizen of the United States, residing at Boston, in the county of Suffolk and State of Massachusetts, have invented a certain new and useful Improvement in Pipe-Wrenches, of which the following is a specification, reference being had therein to the accompanying drawings.

My invention relates to pipe-wrenches provided with a pivoted serrated jaw adapted to fit pipes and objects of various sizes; and the objects of my improvements are to provide a simple, strong, and inexpensive adjustable pipe-wrench having both jaws pivoted together and capable of swinging on each side of the handle.

My invention consists in details of construction hereinafter described, and specifically set forth in the claims.

The wrench is composed of a bar, A, of iron or steel, substantially square in cross-section, and provided with a wooden handle, A', secured to the lower end thereof with a nut, as usual. The upper end of the bar A is cut away on two sides to form thereof a tenon, $a$, capable of entering between the cheeks $b$ of the jaws B, so that said cheeks form the side members of a hinge, while the tenon $a$ forms the central member. These members are perforated to receive the bolt $c$, that unites them, and a nut, $c^2$, is placed upon a screw-threaded end of the latter.

The cheeks $b$ of the jaw B project a sufficient distance beyond the end of the bar A at $b'$ to receive the lug or member $d$, projecting from the inner side of the jaw D. This member is perforated to receive the bolt $e$, that passes through one of the cheeks $b'$, and has its screw-threaded end made to engage with the opposite cheek $b'$. By this construction the jaw B is pivoted directly to the handle, while the jaw D is mounted upon a movable fulcrum forming a part of the opposite jaw, and capable of swinging in an arc of a circle, and causes the jaws to "bite" with great power the pipe or other object placed between them when the handle is turned toward the position indicated by the dotted lines $A^2$. To promote this "biting" quality the lower end of the jaw D is provided with a lug or lip, D', extending to a point opposite, and also lower than the pivot $c$, that unites the serrated jaw B to the extremity of the handle, so that when the handle is turned to the position $A^2$ it forces the lip D' laterally and the jaw D toward the jaw B.

To set the jaws for small objects, and also to permit them to receive said objects near the end of the jaws, as it is often desired while operating in contracted locations, a set-screw, F, is made to pass through the pendent lip D' of the jaw D, so that its point will bear against the side of the bar A and retain the jaw D at any desired angle to the other. The set-screw F is made to pass through the lip D' at right-angles to the side of the bar A, preferably directly opposite the center of the bolt $c$ of the hinge when the jaws are in their normal position, so that if the handle is rocked laterally on either side while the jaws have an object between them the point of the set-screw F, while sliding for a short distance against the side of the bar A above or below said right-angle position, will force the lip D' at a slightly farther distance from the pivot $c$ of the hinge, sufficient to cause the jaws to bite the object, and the amount of bite can be so regulated by the set-screw that there will be no danger of crushing such objects as light sheet-metal pipes.

The side of the bar A adjoining the lip D' of the jaw D is cut away to form a shoulder, $a^2$, (it may have a series of cuts or serrations,) for the lower end of the said lip to bear against when the handle is turned to one side and prevent straining of the hinge or its bolt $c$.

In the drawings one jaw only—viz., the jaw B—is shown as serrated; but it is evident that both jaws may be serrated, or that the jaw B may be plain and the jaw D serrated, or that the jaws may be curved, or one of them hooked, without departing from the spirit of my invention, so long as they are hinged together and one of them is hinged to the handle, as shown.

I am aware that it is not broadly new to have one of the jaws of wrenches pivoted to the handle or main bar thereof, and to provide said jaw with a side lip adapted to bear against the side of said bar, and to have the opposite jaw pivoted to the first-stated jaw; neither is it new to provide one of the jaws with an adjusting-screw to limit or regulate its movement.

Having now fully described my invention, I claim—

1. In a wrench, the combination of the bar A, the jaw B, hinged to the said bar, and the jaw D, hinged to the jaw B, and provided with a lip, D', adapted to bear against the side of the bar A at a point between the pivot $c$ of the jaw B and the handle A', substantially as and for the purpose described.

2. The combination of the bar A, provided with a notch or shoulder, $a^2$, on the side thereof, the jaw B, hinged to said bar, and the jaw D, hinged to the jaw B, and provided with a lip, D', having its extremity adapted to engage with said notch or shoulder between the pivot $c$ of the jaw B and the outer end of the bar A, substantially as and for the purposes described.

3. The combination of the bar A, the jaw B, hinged to said bar, and the jaw D, hinged to the jaw B, provided with a set-screw having its point adapted to bear against the side of the bar A opposite the pivot $c$ of the jaw B, substantially as and for the purpose described.

4. The combination of the bar A, a serrated jaw pivoted to the end thereof, and a jaw pivoted to said serrated jaw, and provided with a lip, D', adapted to bear against the side of the handle between its fulcrum and its free end, substantially as and for the purpose described.

In testimony whereof I affix my signature in presence of two witnesses.

GEORGE F. NEWELL.

Witnesses:
  CHAS. M. REED,
  STILES FROST.